(12) United States Patent
Sai et al.

(10) Patent No.: US 8,098,193 B2
(45) Date of Patent: Jan. 17, 2012

(54) DIGITALLY CONTROLLED UWB MILLIMETER WAVE RADAR

(75) Inventors: Bin Sai, Zuid Holland (NL); Laurent Mauduit, Vignoux Sous les Aix (FR)

(73) Assignee: Honeywell International Inc., Morristown, NJ (US)

( * ) Notice: Subject to any disclaimer, the term of this patent is extended or adjusted under 35 U.S.C. 154(b) by 175 days.

(21) Appl. No.: 12/613,346

(22) Filed: Nov. 5, 2009

(65) Prior Publication Data
US 2011/0102243 A1 May 5, 2011

(51) Int. Cl.
*G01S 13/00* (2006.01)
*G01S 13/08* (2006.01)

(52) U.S. Cl. ............. 342/124; 342/73; 342/89; 342/98; 342/102; 342/103; 342/118; 342/128

(58) Field of Classification Search .................... 342/73, 342/89, 98, 102, 103, 118, 124, 128–132
See application file for complete search history.

(56) References Cited

U.S. PATENT DOCUMENTS

| | | | | |
|---|---|---|---|---|
| 4,072,947 A | * | 2/1978 | Johnson | 342/103 |
| 4,706,089 A | * | 11/1987 | Weindling | 342/25 A |
| 5,455,593 A | | 10/1995 | Ross | |
| 5,610,611 A | * | 3/1997 | McEwan | 342/89 |
| 5,799,534 A | * | 9/1998 | van der Pol | 73/290 V |
| 5,940,457 A | * | 8/1999 | Dreifuss et al. | 375/376 |
| 6,107,957 A | * | 8/2000 | Cramer et al. | 342/124 |
| 6,373,427 B1 | * | 4/2002 | Hohne | 342/128 |
| 6,486,826 B1 | * | 11/2002 | Cramer et al. | 342/124 |
| 6,535,161 B1 | * | 3/2003 | McEwan | 342/124 |
| 6,545,634 B1 | * | 4/2003 | Heide et al. | 342/128 |
| 6,972,709 B1 | * | 12/2005 | Deem et al. | 342/70 |
| 7,046,189 B2 | * | 5/2006 | Spanke et al. | 342/124 |
| 7,053,630 B2 | * | 5/2006 | Westerling et al. | 324/644 |
| 7,196,587 B2 | * | 3/2007 | Klein et al. | 331/16 |
| 7,239,266 B2 | * | 7/2007 | Vacanti | 342/120 |

(Continued)

FOREIGN PATENT DOCUMENTS
WO WO2007029227 A1 3/2007
(Continued)

OTHER PUBLICATIONS

Brumbi, Detlef "Industrial Level Sensing With Radar" Frequenz 60 (2006); pp. 2-5.

*Primary Examiner* — Thomas Tarcza
*Assistant Examiner* — Peter Bythrow
(74) *Attorney, Agent, or Firm* — Jetter & Associates, P.A.

(57) ABSTRACT

An ultra wide band (UWB) millimeter (mm) wave radar system includes a signal source having a control input, a GHz signal output and a frequency controlled output. A control loop is coupled between the GHz signal output and the control input including a frequency divider and a digitally controlled PLL that provides a locked output coupled to the control input of the signal source to provide frequency locked output signals that are discrete frequency swept or hopped. A frequency multiplier is coupled to the frequency controlled output of the signal source for outputting a plurality of mm-wave frequencies. An antenna transmits the mm-wave frequencies to a surface to be interrogated and receives reflected mm-wave signals therefrom. A mixer mixes the reflected mm-wave signals and mm-wave frequencies and processing circuitry determines at least one parameter relating to the surface from the mixing output.

16 Claims, 5 Drawing Sheets

U.S. PATENT DOCUMENTS

| | | | |
|---|---|---|---|
| 7,342,986 B2 * | 3/2008 | Nakamura et al. | 375/376 |
| 7,589,664 B2 * | 9/2009 | Jirskog | 342/124 |
| 7,592,943 B2 * | 9/2009 | Beasley | 342/27 |
| 7,812,760 B2 * | 10/2010 | Teshirogi et al. | 342/135 |
| 7,940,134 B2 * | 5/2011 | Kim | 331/96 |
| 2004/0080324 A1 * | 4/2004 | Westerling et al. | 324/644 |
| 2008/0024358 A1 | 1/2008 | Ikeda | |
| 2009/0256740 A1 * | 10/2009 | Teshirogi et al. | 342/204 |
| 2011/0102243 A1 * | 5/2011 | Sai et al. | 342/124 |

FOREIGN PATENT DOCUMENTS

| | | |
|---|---|---|
| WO | WO2009031884 | 3/2009 |

* cited by examiner

DIGITALLY CONTROLLED UWB MILLIMETER WAVE RADAR

FIELD

Disclosed embodiments relate to frequency domain radar sensing.

BACKGROUND

Non-contact electromagnetic detection and sensing may be used to determine the presence or signatures (object classification or shape) of objects, or levels or the distance to the surface of materials, when other sensing methods have difficulty in providing reliable and/or accurate information. For example, in the oil and gas industry, inaccurate or unreliable tank level measurements can incur a significant loss of profitability/revenue in tank level gauging applications. An error of 1 millimeter (mm) of the level measurement in bulk storage tanks (40-80 meters in diameter) can correspond to volumetric error of several cubic meters. Since the crude oil price is generally at least $70 per barrel (1 barrel=42 US gallons; 159 liters), the 1-mm error can result in thousands of dollars loss for one or more parties involved in trading and oil transfer.

Radar has been used as a type of non-contact level gauge for the last several decades. However, radar measurements can be affected by multiple reflections inside tanks such due to tank walls, the tank bottom, the tank roof and tank obstructions including agitators, ladders and the heat coil. Furthermore, every tank generally has to use the maximum capacity for oil storage and transfer. It requires the measurements be constantly reliable as the level of product approaches the bottom or the roof of the tank.

Moreover, the electronic components and dielectric materials in conventional radar systems are temperature dependent. Radar measurement stability can be affected by temperature variations due to local weather conditions as well as a large variety of geographical locations at which the installed bases are located, such as in the Middle East (e.g., very hot) or northern poles regions (e.g., very cold). In practical applications, the limited number of tank nozzles can constrain the installation of larger sized devices, and even if there are possible additional nozzles, the costs of the large size units would be increased. Therefore, regular on-the-spot maintenance of the radar level gauges are unfortunately required due to the need of re-calibration to temperature drifts, and obstruction interferences, which incurs extra costs to customers and/or suppliers.

SUMMARY

This summary is provided to comply with 37 C.F.R. §1.73. It is submitted with the understanding that it will not be used to interpret or limit the scope or meaning of the claims.

Disclosed embodiments described herein comprise ultra-wideband (UWB) radar systems that provide high-resolution capability at millimeter (mm)-wave frequencies. As defined herein, UWB refers to a bandwidth of at least 0.5 Giga Hertz (GHz), or fractional bandwidth of at least 25%, while mm-wave refers to signals in a frequency range from 30 GHz to 300 GHz.

In a typical embodiment, during system operation the radar frequency is swept in a bandwidth of at least 2 GHz, such as 4 GHz, in tens of milliseconds, in a typical time span of 40 to 100 msecs.

The ultra-large bandwidth is swept using a stable signal source. Swept frequencies are controlled by a phase locked loop (PLL) at each frequency, and can be stabilized over a large range of temperature, such as −40° C. to +85° C. Temperature variation impacts are generally suppressed by a single reference frequency source for the PLL, such as a stable crystal oscillator.

As known in the art, range resolution is based on transmitted signal bandwidth, the receiver bandwidth being dependant on system sweep time and the propagation medium. For a 4 GHz signal bandwidth, the resulting range resolution is equal to or better than 4 cm. A high range resolution of around 4 cm or better leads to high resolved power for the sensor. The swept wide band of frequencies can utilize a variety of frequencies in the mm-wave range, such as those between 75 GHz and 85 GHz (the band currently allowed in Europe for level gauging applications according to EN302372).

Due to high frequency operation, the radar antenna can be miniaturized to fit into a small nozzle, and in typical embodiments the radome and antenna together have a transverse dimension of less than 100 mm and a total length of less than 100 mm. Disclosed embodiments generally overcome the problems described above in the background. For example, as demonstrated in the Examples below, the high-resolution radar solves the problems of tank wall effects under which other radars suffer from severe accuracy degradation. Also, the high resolution provided can solve the interferences from multiple closely spaced objects (e.g., obstructions).

DETAILED DESCRIPTION

Disclosed embodiments are described with reference to the attached figures, wherein like reference numerals are used throughout the figures to designate similar or equivalent elements. The figures are not drawn to scale and they are provided merely to illustrate the disclosed embodiments. Several aspects are described below with reference to example applications for illustration. It should be understood that numerous specific details, relationships, and methods are set forth to provide a full understanding of the disclosed embodiments. One having ordinary skill in the relevant art, however, will readily recognize that the disclosed embodiments can be practiced without one or more of the specific details or with other methods. In other instances, well-known structures or operations are not shown in detail to avoid obscuring the disclosed embodiments. The disclosed embodiments are not limited by the illustrated ordering of acts or events, as some acts may occur in different orders and/or concurrently with other acts or events. Furthermore, not all illustrated acts or events are required to implement a methodology in accordance with disclosed embodiments.

Figure 1:
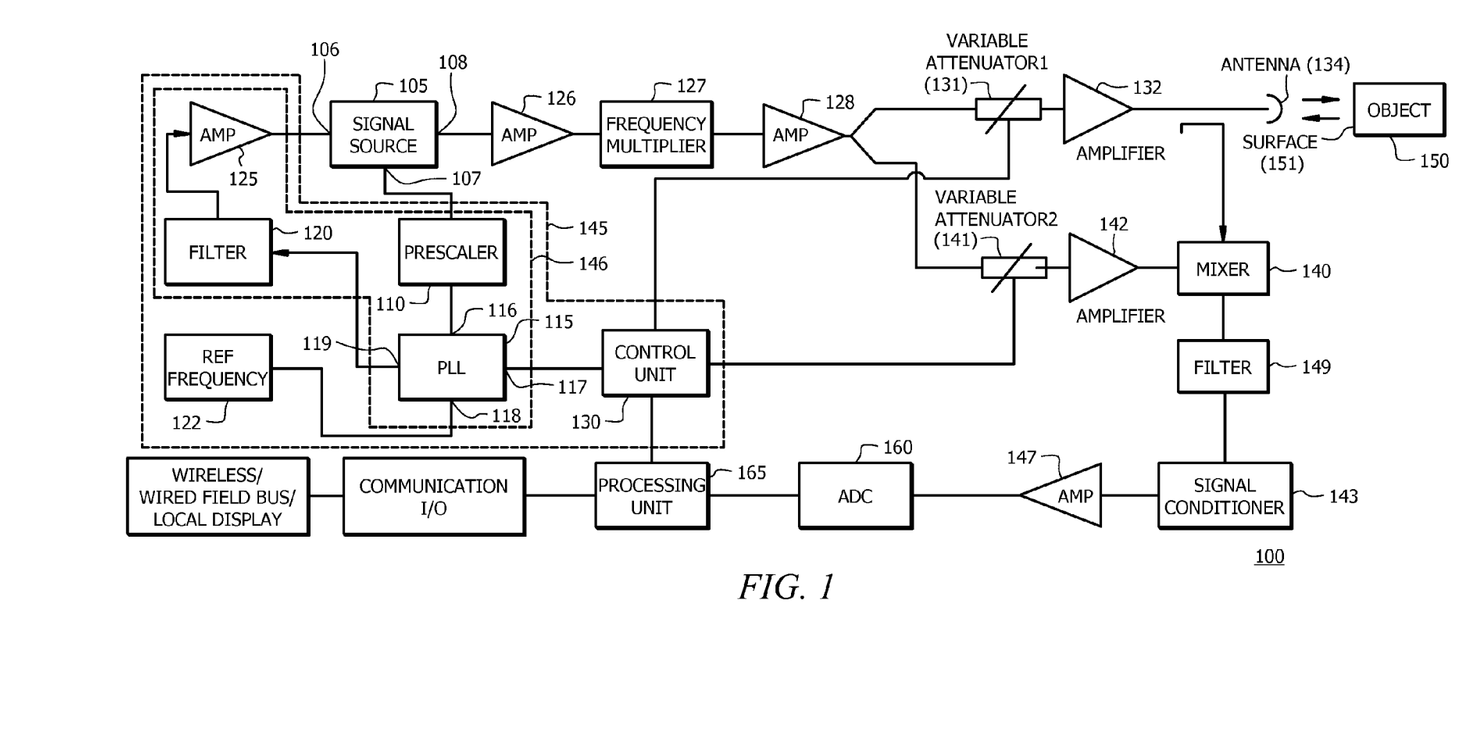
FIG. 1 is a block diagram of an exemplary UWB mm-wave radar system, according to an embodiment of the invention.

FIG. 1 is a block diagram of an exemplary UWB mm-wave radar system 100, according to an embodiment of the invention. System 100 provides frequency domain radar sensing and measurements for applications including, but not limited to, distance, level, and signature determination.

System 100 implements stepped-frequency continuous-wave (SFCW) or frequency hopping which may be contrasted with frequency-modulated continuous-wave (FMCW). FMCW uses a continuous (linear) frequency sweep versus time that does not provide system knowledge of each individual frequency, but is advantageous in that it takes a relatively short time to sweep up and/or down the whole frequency band (so-called instantaneous band). In contrast, SFCW and related frequency hopping is realized in discrete frequencies, and as described below the discrete frequencies are controlled using a PLL that for each discrete frequency needs time to establish a stable and coherent output signal and time to measure the signal returns (e.g., reflections). SFCW and related frequency hopping thus provides knowledge of each individual frequency which improves system performance over FMCW, but generally takes more time to traverse the bandwidth as compared to FMCW.

Signal source 105 has a control input 106, a base GHz signal output 107 and a frequency controlled output 108 that provides a plurality of discrete frequency controlled GHz signals. Signal source 105 in the embodiment described relative to FIG. 1 can comprise a voltage control oscillator (VCO). As known in the art, a VCO is an electronic oscillator designed to be controlled in oscillation frequency by a voltage signal applied to its input. The frequency of oscillation is generally controlled by varying the amplitude of an applied DC voltage. Alternatively, although generally more costly, signal source 105 can be embodied as a direct digital synthesizer (DDS).

System 100 comprises frequency control circuitry 145 including a control loop 146 that is coupled between the GHz signal output 107 and the control input 106. Control loop 146 comprises a frequency divider 110 shown as prescaler 110, PLL 115, loop filter 120 and first amplifier 125 (e.g., operational amplifier).

Prescaler 110 generally provides a frequency division so that the output frequency of the frequency divided signal provided to the PLL 115 is low enough for the PLL 115 to process the signal, such as $\leq 3$ GHz. In one particular example, GHz signal output 107 is at 15 GHz and prescaler 110 provides a frequency division of at least 6, such as 8. Although frequency divider 110 is shown in FIG. 1 comprising a prescaler, frequency divider 110 can comprise more generally any device that provides frequency division.

The output of the prescaler 110 is coupled to PLL 115 that as known in the art generates a stable frequency output using negative feedback. PLL 115 generally is a dual mode PLL that provides both integer and fractional mode operation. PLL 115 has a first input 116 coupled to an output of prescaler 110 to receive the frequency divided signal, a second input 117 for receiving digital control signals from control unit 130, a third input 118 for receiving a reference frequency signal from reference frequency generator 122, and after a period of time to settle, locked output 119 is generated. Locked output 119 provides output signals to control frequency sweep or frequency hopping based on the digital control signals from control unit 130 which can be programmed in software or firmware. Reference frequency generator 122 can comprise a crystal oscillator which provides high temperature stability, or an oscillator integrated with an internal PLL locked clock, or a synthetic locked frequency clock can be obtained from other programmable devices such as PLD, FPGA and chips with an internal integrated PLL clock. The output level provided by first amplifier 125 controls the frequency tuning of the signal source 105, such as by providing a tuning voltage level range (e.g., 0 to 10 Volts) to control input 106 of signal source 105.

The locked signal provided by frequency controlled output 108 is coupled to second amplifier 126 and then to frequency multiplier 127 that outputs a plurality of mm-wave frequencies, which is then coupled to third amplifier 128. The signal output by third amplifier 128 is then split with a portion directed to antenna 134 for transmission of the mm-wave signal towards the surface 151 of object 150.

FIG. 1 also shows a first variable attenuator 131 that is level controlled by control unit 130, and a fourth amplifier 132 to provide the optional ability to amplify or divide down the mm-wave signal amplitude before being transmitted by antenna 134. Although antenna 134 is shown as a single antenna, as known in the art the antenna can be embodied as separate transmit and receive antennas. Although it is possible to use separate radar antennas for the transmitted radar signal and for the reflected radar signal, it is common practice to use the same radar antenna for transmitting as well as for receiving. The radar system 100 can indirectly measure the time difference $\Delta t$ between the transmitted radar signal and the received radar signal. If the velocity of the transmitted radar signal is known, the distance to the surface of the liquid can be determined in a simple manner, using suitable measuring means. Surface 151 is responsive to the incident mm-wave signals provide reflected (or scattered) signal returns.

System 100 also includes frequency mixer 140 which includes a mixing output, such as provided by a diode-base device. As known in the art, a frequency mixer 140 is a nonlinear or time-varying circuit or device that accepts as its input two different frequencies and presents at its output a mixture of signals at several frequencies including the sum of the frequencies of the input signals, the difference between the frequencies of the input signals, and both original input frequencies.

Frequency mixer 140 mixes the signal returns from the detected object 150 with the portion of the mm-wave signal split after third amplifier 128. Second variable attenuator 141 which is controlled by control unit 130 and a fifth amplifier 142 provide the optional ability to amplify or divide the UWB mm-wave signal portion provided by the split. During operation of system 100, for each discrete mm-wave frequency, the PLL 115 takes a short period of time to establish a stable and coherent output signal, part of which is coupled to a frequency mixer 140 to mix with the signal returns from the detected object 150. The frequency of interest provided by frequency mixer 140 is the difference signal that generally is at a very low frequency (e.g., a DC signal) that results from a phase shift of the signal return (i.e. reflected signal) as compared to the mm-wave signal transmitted by antenna 134. Low pass filter 149 passes the low frequency difference signal and blocks the other signals output by frequency mixer 140.

As known in the art, very high frequency operation allows very small size antennas. In general, no special antenna is needed as long as the antenna matches the signal generated by transmitter. A flange (not shown) combined with the antenna can be designed to suppress condensation, and to satisfy certain safety relations (e.g., be gas tight). An advantage of the small size antenna enabled by mm-wave signals is that the antenna can generally fit into a variety of commercially available nozzles on vessels, containers and tanks. For example, in one particular embodiment, the radome and antenna together can have a transverse dimension of 59 mm and total length of 45 mm.

After optional signal conditioning to adjust the input signal amplitude and remove the offset residues by signal conditioner 143 and amplification by sixth amplifier 147, the low frequency signal is digitized by analog to digital converter (ADC) 160. The output of ADC 160 is coupled to processing unit 165. Processing unit 165 can perform digital signal processing such as an inverse FFT to process the digitized low frequency signal associated with each of the individual mm-wave frequencies from the mixer 140. Processing unit 165 can determine range information such as a distance, level or signature from surface 151 of object 150 from the processed low frequency difference signals.

Figure 2A:
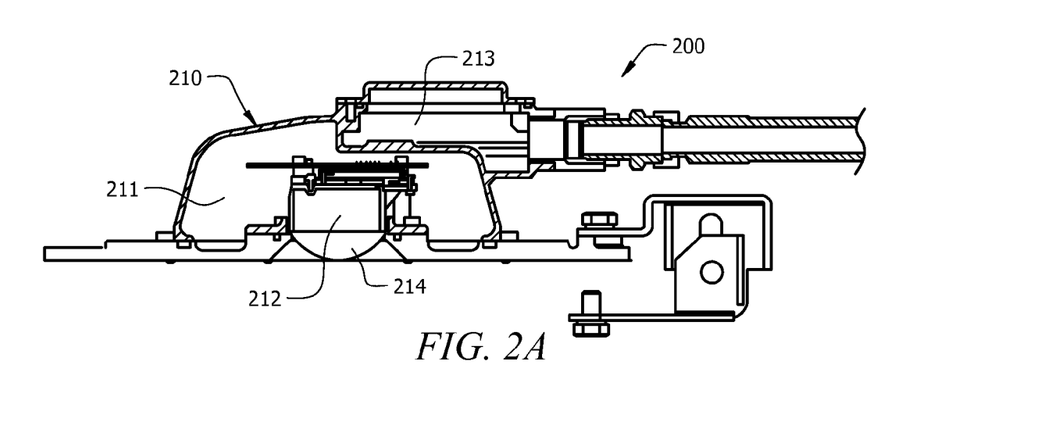
FIGS. 2A and 2B show a cross sectional and a top view depiction of an exemplary UWB mm-wave radar system enclosed in a housing, according to an embodiment of the invention.
Figure 2B:
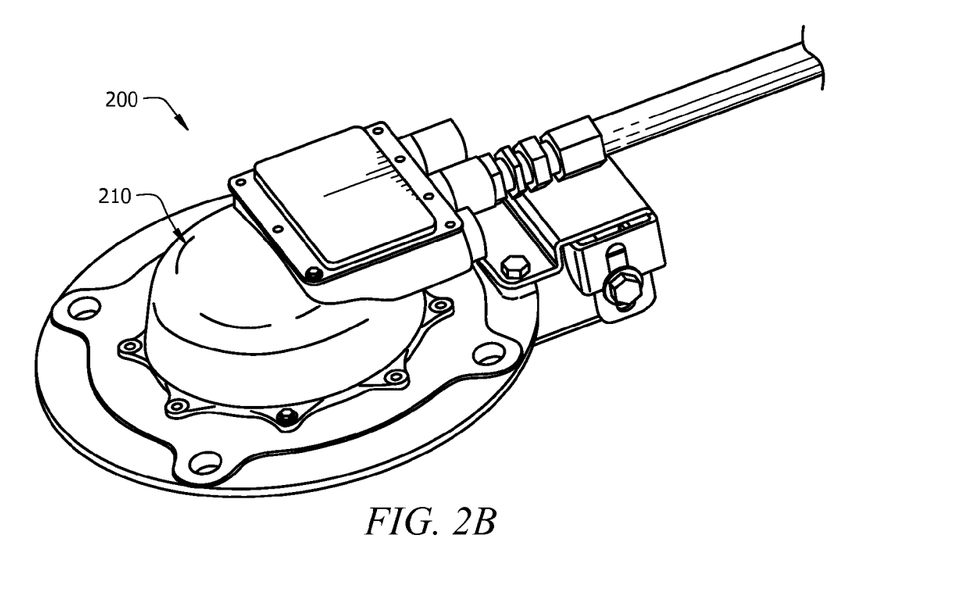

FIGS. 2A and 2B show a cross sectional and a top view depiction of an exemplary UWB mm-wave radar system 200 having a housing 210 that provides a structural and waterproof enclosure, according to an embodiment of the invention. System 200 can be based on the components of system 100 shown in FIG. 1. The radome 214 can comprise PTFE-like material for chemical resistance. The housing 210 together with radome 214 can protect the electronics therein from being damaged by water, chemicals and other liquid, shielding the unwanted radiation for EMC compliance, complying with ATEX safety requirements for use in hazardous areas, protecting gas and vapor from entering into the chambers inside the housing. The curved shape shown by radome 214 can address condensation and contamination that is generally present inside tanks The housing 210 is shown divided up into a plurality of zones or "rooms" 211, 212, 213 as shown in FIG. 2A. Rooms can include a first room including the mm-wave front-end unit and a DSP board, a second room including a non Intrinsically Safe (I.S.) power and communication board, and a third room including an I.S. board for external sensors such as PT 100 temperature probes or pressure transmitters or digital display. The second and third rooms can be combined into a single room.

Although described above on the basis of phase shifts to determine distance, level or signature, those having ordinary skill in the art will recognize system 100 may be modified to allow practice of other methods that may generally be used with embodiments of the invention. For example, the phase difference $\Delta\phi$, between the transmitted signals and the received (i.e. reflected) radar signals can be determined, which value can form the basis for the determination of a level distance L, such as disclosed in published international application WO2009031884.

As described above, the high range-resolution provided is based on high bandwidth. Further advantage is the short sweep time can make the measurement closely follow during rapidly changeable conditions, such as fast loading and/or of discharging vessels for applications involving quick movement of liquid surfaces in tanks.

Applications for embodiments disclosed herein go well beyond level gauging. For example, speed measurement and object recognition are but a few examples.

EXAMPLES

Embodiments of the invention are further illustrated by the following specific Examples, which should not be construed as limiting the scope or content of embodiments of the invention in any way.

A prototype W-band radar gauge system analogous to system 100 shown in FIG. 1 was built and its performance evaluated in a series of demonstrations. Both the mm-wave portion with antenna and antenna radome were integrated into a control board with DSP (for the processor), complex programmable logic device (CPLD) and PLL. In addition, RS232 and onboard power supply to different parts were implemented on the control board. The external connection only included a power supply of 6 V and a RS232 communication line. The radar system parameters were configured through the RS232 communications by a PC. The system was installed 1.5 meters above the metal ground plane (tank wall).

This is believed to be first time a PLL comprising control circuit was used to control a $\geqq 4$ GHz bandwidth radar in the mm-wave band. The radar system was found to sweep a 4 GHz bandwidth within 51 ms. As described above, the generated frequencies from the signal source are controlled by PLL-control technology. Two different PLL techniques were implemented in the demonstration, namely fractional and integer.

Figure 3:
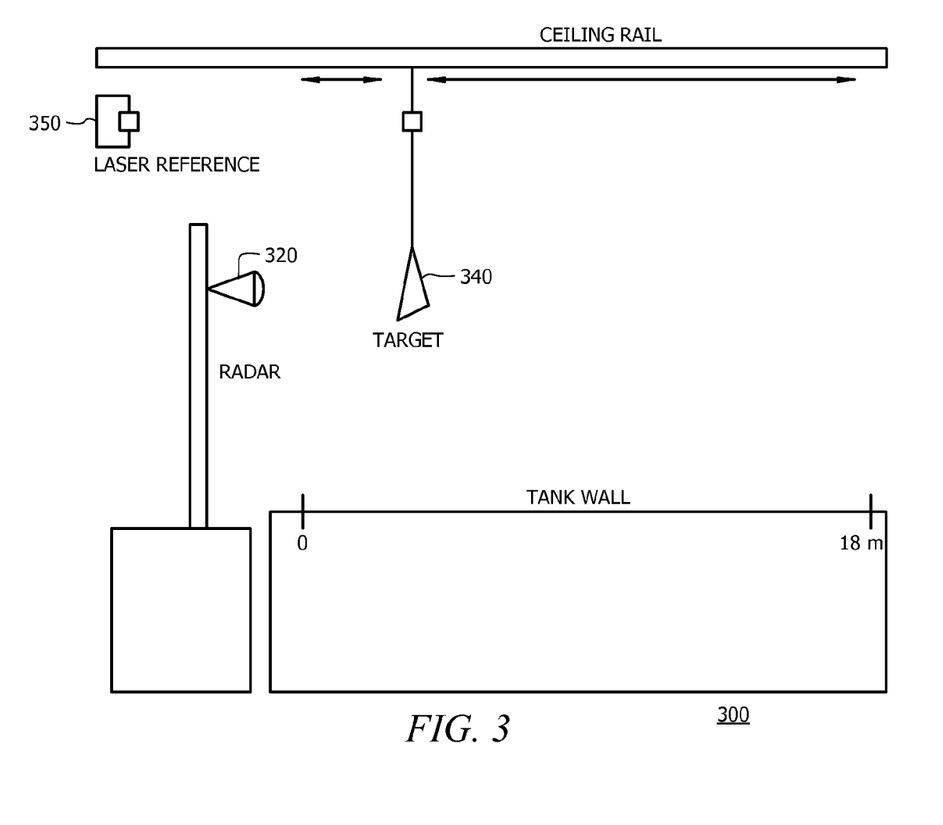
FIG. 3 is a schematic of the exemplary measurement setup employed for testing a mm-wave radar system according to an embodiment of the invention that is mounted above a tank wall.

FIG. 3 is a schematic of the measurement setup 300 employed for testing a mm-wave radar system according to an embodiment of the invention that is mounted above a tank wall. The radar system 320 was pointed towards target 340. A laser reference 350 was also provided.

Figure 4A:
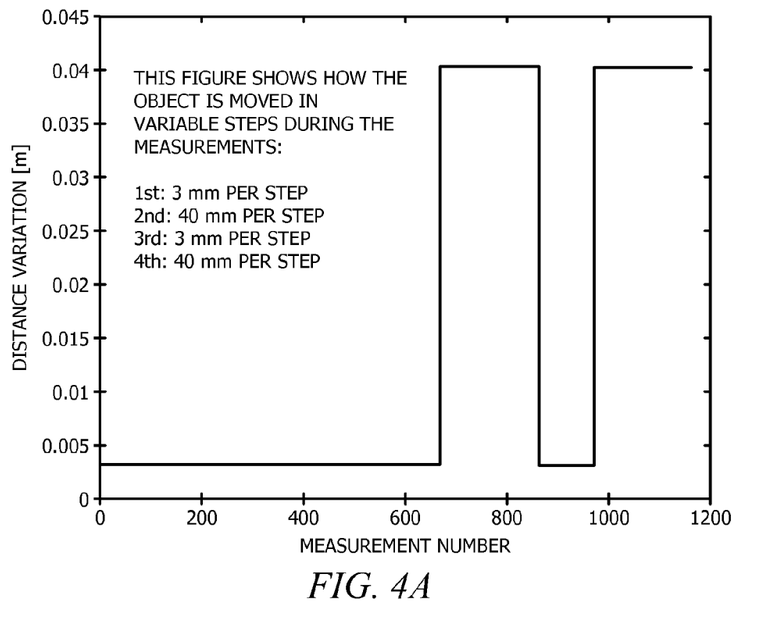
FIG. 4A shows how the target shown in FIG. 3 is moved in variable steps during the measurements described in the Examples below.
Figure 4B:
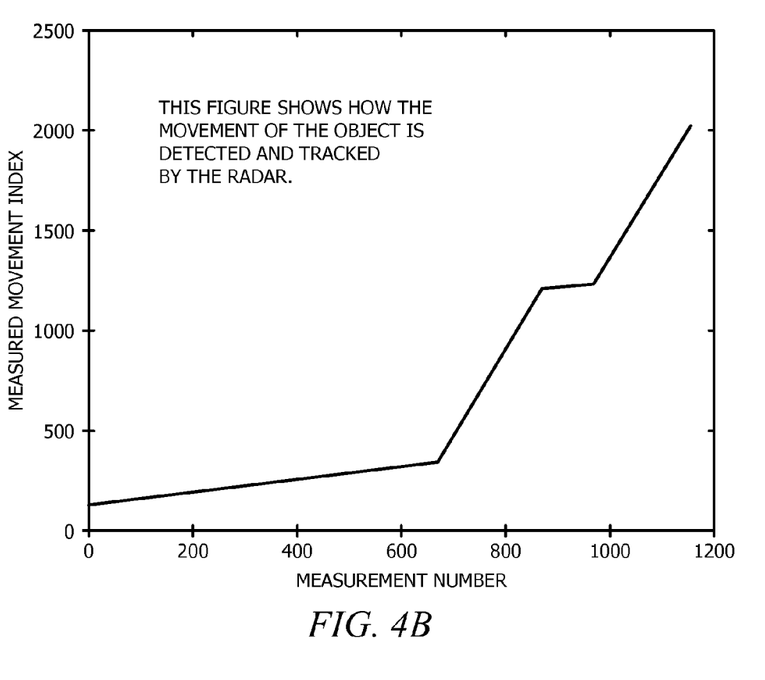
FIG. 4B shows how the movement of the target is detected and tracked by the radar system described in the Examples below.

Results obtained from the setup 300 shown in FIG. 3 are described below with reference to FIGS. 4A-5B. FIG. 4A shows how the target 340 is moved in variable steps between the measurements: 1st: 3 mm per step; 2nd: 40 mm per step; 3rd: 3 mm per step; and 4th: 40 mm per step. FIG. 4B shows how the movement of the target 340 is detected and tracked by the radar system.

Figure 5A:
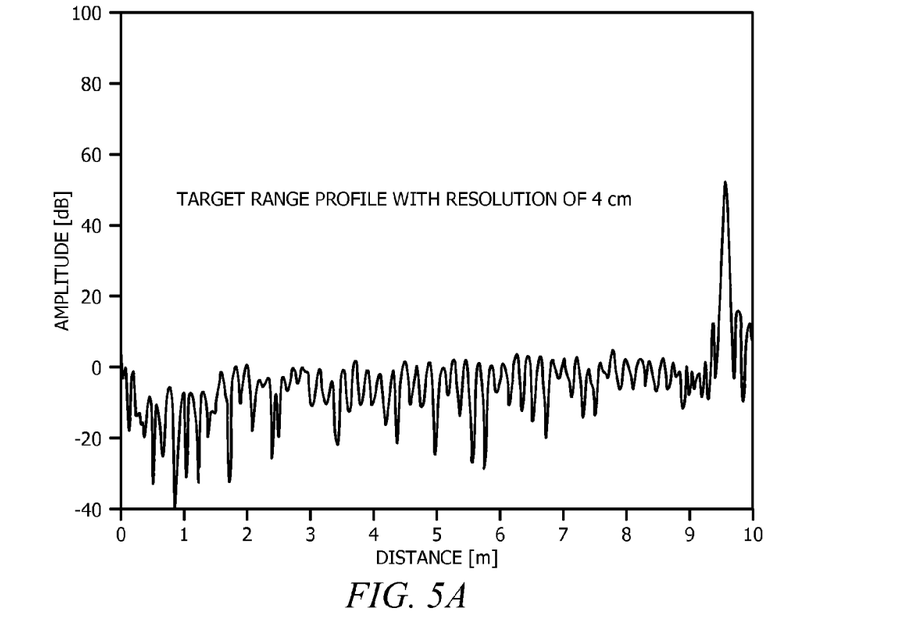
FIG. 5A shows the detected object at 9.57 meters with a very high range resolution of about 4 cm, which is about 2 to 4 times better than that of current radar systems, as described in the Examples below.
Figure 5B:
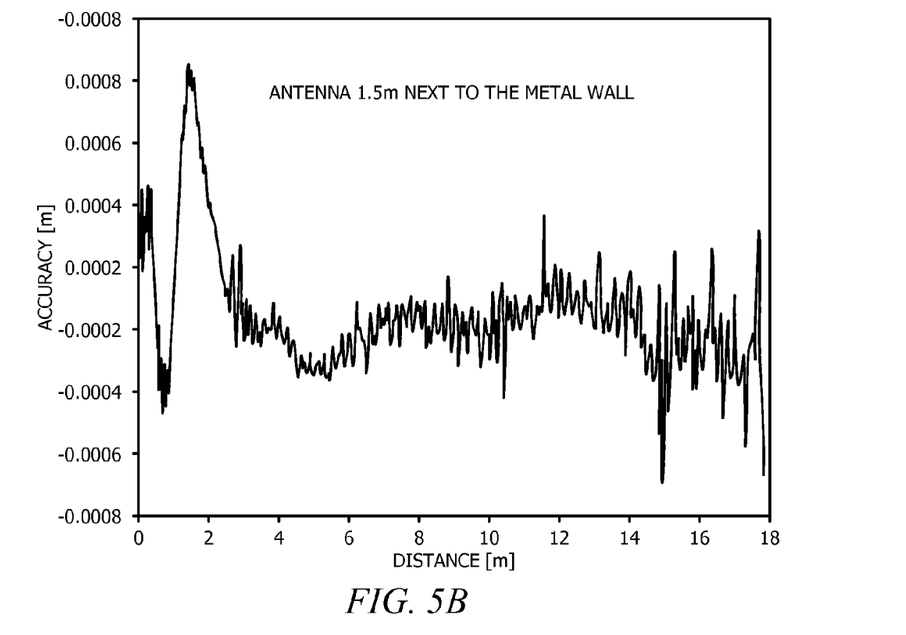
FIG. 5B shows results obtained from processed data measured by the radar system with a 4 GHz BW that evidences measurement accuracy that is comparable to that of a high-end laser, as described in the Examples below.

FIG. 5A shows the detected object at 9.57 meters with very high range resolution of about 4 cm, which is about 2 to 4 times better than that of current radar systems. FIG. 5B shows results obtained from processed data measured by the radar system with 4 GHz BW. FIG. 5B evidences sub-mm accuracy better than +/−0.8 mm. The measured accuracy is comparable to that of a high-end laser, yet the system is configurable at a relatively low price.

Based on the demonstration, superior performance in dealing with tank wall effects was demonstrated. With the radar installed 1.5 meters next to the large metal plane, there were no measurable tank wall effects found to be imposed on the radar, which other radars normally suffer from. The radar gauging accuracy obtained was very high primarily due to UWB along with hardware and modulation techniques described above. As described above, the mm-wave (high frequency) operation allows smaller antenna size as well as a miniaturized transmitter and receiver.

While various embodiments of the invention have been described above, it should be understood that they have been presented by way of example only, and not limitation. Numerous changes to the disclosed embodiments can be made in accordance with the disclosure herein without departing from the spirit or scope of the disclosed embodiments. Thus, the breadth and scope of embodiments of the invention should not be limited by any of the above explicitly described embodiments. Rather, the scope of such embodiments should be defined in accordance with the following claims and their equivalents.

Although the embodiments of invention have been illustrated and described with respect to one or more implementations, equivalent alterations and modifications will occur to others skilled in the art upon the reading and understanding of this specification and the annexed drawings. In addition, while a particular feature may have been disclosed with respect to only one of several implementations, such features may be combined with one or more other features of the other implementations as may be desired and advantageous for any given or particular application.

The terminology used herein is for the purpose of describing particular embodiments only and is not intended to be limiting to embodiments of the invention. As used herein, the singular forms "a," "an," and "the" are intended to include the plural forms as well, unless the context clearly indicates otherwise. Furthermore, to the extent that the terms "including," "includes," "having," "has," "with," or variants thereof are used in either the detailed description and/or the claims, such terms are intended to be inclusive in a manner similar to the term "comprising."

Unless otherwise defined, all terms (including technical and scientific terms) used herein have the same meaning as commonly understood by one of ordinary skill in the art to which embodiments of the invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the following claims.

We claim:

1. An ultra wide band (UWB) millimeter (mm) wave radar system, comprising:
    a signal source having a control input, a Giga Hertz (GHz) signal output and a frequency controlled output that provides a plurality of frequency controlled signals:
    a control loop coupled between said GHz signal output and said control input comprising (i) a frequency divider coupled to said GHz signal output for generating a frequency divided signal and (ii) a phase locked loop (PLL) having a first input coupled to an output of said frequency divider, a second input for receiving digital control signals, a third input for receiving a reference frequency signal, and a locked output coupled to said control input of said signal source that provides frequency locked output signals that are frequency swept or hopped by said digital control signals;
    a control unit for providing said digital control signals to said second input of said PLL;
    a frequency multiplier coupled to said frequency controlled output of said signal source, said frequency multiplier outputting a plurality of mm-wave frequencies;
    at least one antenna for transmitting said plurality of mm-wave frequencies to a surface to be interrogated and for receiving reflected signals from said surface;
    a mixer for mixing said reflected mm-wave signals from said surface and said plurality of mm-wave frequencies, said mixer providing a mixing output; and
    signal processing circuitry coupled to an output of said mixer for determining at least one parameter relating to said surface from said mixing output.

2. The system of claim 1, wherein said control loop further comprises a first amplifier connected between said PLL output and said control input of said signal source for amplifying said frequency locked output signals to generate amplified PLL output signals.

3. The system of claim 2, further comprising a low pass filter coupled between said PLL and said first amplifier.

4. The system of claim 1, wherein said plurality of mm-wave frequencies comprise UVB mm-wave signals.

5. The system of claim 1, wherein said frequency divider comprises a prescaler.

6. The system of claim 5, wherein said prescaler provides a frequency division of $\geq 6$.

7. The system of claim 1, further comprising a reference frequency source coupled to said third input of said PLL, said reference frequency source providing said reference frequency signal for said PLL, and wherein said reference frequency source comprises a crystal oscillator or oscillator integrated with an internal PLL locked clock.

8. The system of claim 1, wherein said bandwidth is $\geq 4.0$ GHz.

9. The system of claim 1, further comprising a low pass filter coupled between said mixer and said signal processing circuitry, said low pass filter selectively passing difference signals between said plurality of mm-wave frequencies and corresponding ones of said reflected mm-wave signals.

10. A frequency modulated UWB millimeter wave radar method for determining a level or distance to a surface of an object, comprising:
    transmitting a plurality of discrete, stepped or hopped frequency mm-wave radar signals to said surface of said object, wherein a bandwidth of said plurality of stepped or hopped frequency mm-wave radar signals is >2 GHz;
    receiving reflected mm-wave radar signals that are reflected from said surface in a time sequence, and
    determining said level or distance based on said plurality of discrete, stepped or hopped frequency mm-wave radar signals and their corresponding ones of said reflected mm-wave radar signals.

11. The method of claim 10, wherein said plurality of mm-wave frequencies comprise UWB mm-wave signals and wherein said bandwidth of said plurality of UWB mm-wave frequencies is $\geq 4.0$ GHz.

12. The method of claim 10, wherein a digitally controlled PLL controls a frequency sweep across said bandwidth.

13. The method of claim 10, wherein said determining is based on a difference in frequency between said plurality of discrete, stepped or hopped frequency mm-wave radar signals and their corresponding ones of said reflected mm-wave radar signals.

14. The method of claim 10, wherein said method comprises determining said level for a liquid in a tank or a vessel.

15. The method of claim 10, wherein said method provides a range resolution equal to or better than 4 cm.

16. The system of claim 1, further comprising an amplifier coupled to an output of said frequency multiplier, wherein an output of said amplifier is coupled to a first variable attenuator that is level controlled by said control unit and coupled to said antenna, and a second variable attenuator that is level controlled by said control unit and coupled to said mixer.

* * * * *